United States Patent [19]
Münsch et al.

[11] Patent Number: 6,036,060
[45] Date of Patent: Mar. 14, 2000

[54] ROTARY VALVE

[75] Inventors: Erwin Münsch, Untergruppenbach; Christian Maday, Bad Rappenau, both of Germany

[73] Assignee: Waechle GmbH, Weingarten, Germany

[21] Appl. No.: 09/196,360

[22] Filed: Nov. 19, 1998

[30] Foreign Application Priority Data

Nov. 22, 1997 [DE] Germany .............................. 197 51 921

[51] Int. Cl.⁷ .................................................. G01F 11/10
[52] U.S. Cl. .......................................................... 222/368
[58] Field of Search .................................... 222/368, 370; 251/314; 137/624.13

[56] References Cited

U.S. PATENT DOCUMENTS

| | | | |
|---|---|---|---|
| 4,982,760 | 1/1991 | Mustaklem | 251/314 |
| 5,538,383 | 7/1996 | Ikeda et al. | 222/368 |

FOREIGN PATENT DOCUMENTS

| | | |
|---|---|---|
| 0 594 949 | 5/1994 | European Pat. Off. . |
| 36 23 454C1 | 10/1987 | Germany . |

*Primary Examiner*—Kevin Shaver
*Assistant Examiner*—Keats Quinalty
*Attorney, Agent, or Firm*—Burns, Doane, Swecker & Mathis, LLP

[57] ABSTRACT

A rotary valve comprises a housing having a supply opening and a discharge opening and defining an inner substantially rotary symmetrical wall around an axis of rotation. A cellular wheel is supported rotatably about the axis of rotation within the housing, and includes a hub or shaft. A series of inner web plates is arranged to extend radially in a star-shape on the hub and have a radial outer wedge surface inclined with respect to the axis of rotation. An equal number of outer web plates have each a radial inner wedge surface which rides on and engages the radial outer wedge surface of a respective inner web plate. The web plates are guided by respective radial guidances. In the region of the radial outer edge of each of the outer web plates is a sealing strip radially displaceable and guided by a respective radial guidance to engage the housing's inner wall. An adjusting device generates an axial force to bias at least one series of the inner and outer web plates to provoke a radial adjustment of the sealing strips when the web plates glide along the interengaging wedge surfaces relative to each other.

17 Claims, 4 Drawing Sheets

ROTARY VALVE

This application claims priority under 35 U.S.C. §§119 and/or 365 to 197 51 921.0 filed in Germany on Nov. 22, 1997; the entire content of which is hereby incorporated by reference.

FIELD OF THE INVENTION

The present invention relates to a rotary valve which comprises a housing having a supply opening and a discharge opening and defining an inner substantially rotary symmetrical wall around an axis of rotation. A cellular wheel is supported within the housing and is rotatable about this axis of rotation. The cellular wheel has a predetermined axial length and includes a hub or shaft for driving the wheel and a series of web plates arranged to extend radially in a star-shape on said hub so as to form the individual cells around the axis of rotation. Sealing strips, one on each of the peripheral edge of a web plate, are movably guided within guidances. An adjusting arrangement generates an axial force which is converted into a radial pressure onto the sealing strips by wedge surfaces inclined relative to the axis of rotation.

BACKGROUND OF THE INVENTION

Rotary valves of the type described are used, in general, for discharging bulk material from vessels or bins for packaging or transferring them to a conveyor system. Moreover, rotary valves can be used for metering purposes, because, with a predetermined volume of the individual cells, the mass flow can be controlled easily by acting on the revolutions per time unit of the cellular wheel.

Such a rotary valve is supported on either side of the passage for the bulk material within a flange of the housing. The web plates have to be tightened against the inner wall of the housing both in peripheral direction and on the front side. For tightening in peripheral direction, they may be equipped with the sealing strips.

Since most of the bulk materials result in wear of the web plates or the sealing strips, it is advantageous if the web plates are provided with self-adjusting sealing strips radially displaceable within guidances for compensating wear. These sealing strips are biased by pressure which, for example, is generated by deformation of an elastic device, such as a pressure spring. The springs can be accommodated directly within the web plates (EP-A-0 594 949). Since, in this way, at least one pressure spring is needed for each displaceable sealing strip, construction and mounting of the rotary valve are quite expensive. In addition to that, there is a certain susceptibility to trouble, because the springs, and thus the spring forces, are small due to the very narrow space available within the web plates. If a sealing strip jams within its guidance, the spring force is insufficient to overcome the clamping forces so that the peripheral seal will fail.

In another known design (DE 36 23 454), from which the invention initiates, the drive shaft is formed as a hollow shaft. The displaceable sealing strips are biased by radial pressure transmitted from the hollow shaft. To this end, an adjusting device is arranged within the hollow shaft, the device converting the axial force commonly generated by a pressure spring into a radial pressure force by means of two conical actuating surfaces.

This radial pressure force act upon radially displaceable bolts guided within the web plates. The bolts transmit the radial forces onto the displaceable sealing strips of the cell defining web plates.

This construction too is expensive. Due to the cylindrical guidances for the bolts within the cell defining web plates, the latter become necessarily thicker. In this way, the usable cell volume, and thus the mass flow at a predetermined number of revolutions per time unit, are reduced. A further disadvantage of this construction is that the radial forces are transmitted pointwisely onto the sealing strips, leading to high surface pressure in the sliding zones where the components slide on each other and, thus, favoring wear. Furthermore, uniform surface pressure of the sealing strips, as desirable, can only be achieved when using a very hard sealing material which contradicts a good sealing effect. Likewise, unfavorable conditions in transmission of forces exist between the conical actuating surfaces of the adjusting device and the bolts.

SUMMARY OF THE INVENTION

It is an object of the present invention to simplify a rotary valve of the type mentioned above in constructive respect, while improving its function in order to achieve a design reliable in function.

According to the invention, this object is attained by dividing the cell defining web plates into first, wedge-shaped inner web plates displaceable in the guidances and being shorter than the axial length of the cellular wheel, and second wedge-shaped outer web plates displaceable in the guidances, wherein axial forces generated by the adjusting device and effective on individual ones or all inner web plates are convertible into radial or perpendicular forces via the actuating wedge surfaces.

In principle, it would be possible to invert the arrangement in such a way that the axial forces of the adjusting device act upon the outer web plates, e.g. by an axially displaceable disk pressing onto axially outer prolongations of the outer web plates. The latters may be held in position by passing through radial slots in an (inner, with respect to the axially displaceable disk) front disk(s). Slots in these cell defining walls do not cause necessarily any harm; they can be either sealed, e.g. by sealing lips or brushes extending from at least one side over the length of the slots, or can remain open, e.g. when the granulometry of the bulk material is coarser than the width of the slots. It will be clear, in this connection that the outer web plates would move relative to the respective sealing strip which is less preferred.

Furthermore, it is conceivable that the respective axially displaceable wedge-shaped web plates are not shorter than the axial length of the cellular wheel, but have prolongations which project more or less through the aforementioned slots in the respective front disk. It would even be possible that both, the inner and the outer web plates are displaceable in opposite direction. However, the use of the inner wedge-shaped web plates to transfer pressure and movement is, in most cases, preferred.

According to the invention, not only the sealing strips, but also the wedge-shaped inner and outer web plates are displaceable within the guidances. The axial force generated by the adjusting device can act in such a way upon the respective web plates, preferably the inner web plates, that the actuating surfaces, inclined relative to the shaft's axis, are pressed against each other by a force perpendicular to it. This perpendicular force is converted into radial pressure acting upon the sealing strips in correspondence with the angle of inclination of the actuating surfaces and corresponding also to the frictional conditions between these actuating surfaces, on the one hand, and between the web plates and their guidances, on the other hand. When the sealing strips wear out due to the effective pressure, relative displacement will occur between the inner and outer web plates, while the perpendicular force acting upon the actuating surfaces, now operating as sliding surfaces, is maintained. In the preferred embodiment, this relative displacement is enabled by the fact that one series of web plates, particularly the inner web plates, are shorter than the axial cell length of the cellular wheel, thus allowing axial shifting. As preferred, the inner web plates will displace in axial direction, while the outer ones move in radial direction, thus compensating for any radial wear of the sealing strips. The special advantage of the construction according to the invention is that wedge-shaped web plates are used for converting the axial forces acting individually or in common into the (inner) web plates into radial pressure so that conversion is effected almost over the entire axial cell length. In this way, the surface pressure of the sealing strips becomes really uniform, even when using soft sealing material, and conversion of forces is effected by the actuating surfaces without remarkable wear. Moreover, the web plates need not to provide a space for inserting any force transmitting component so that the web plates need no longer to be relative thick. This results in material savings, on the one hand, and in a larger usable cell volume.

The advantages of the construction according to the invention are independent from the nature of the axial forces generated individually or in common and acting upon the (inner) web plates that the actuating surfaces at the interface of the wedge-shaped web plates are strained under the above-mentioned perpendicular forces. These axial forces can be generated in common by a pneumatic cylinder, a hydraulic cylinder or a spring mechanism, e.g. either attached to front side of the rotary valve or inserted into a hollow shaft of the cellular wheel. The axial forces can be generated individually e.g. by pressure springs attached to at least one cell defining front disk and acting upon the inner web plates.

An advantageous embodiment for inducing axial forces generated in common into the inner web plates may consist in a hollow shaft having a series of axially extending slots where each slot is assigned to one of the first or inner web plates. An axially shiftable body, preferably a cylinder, within the hollow shaft is biased by the axial force and is positively connected to the first or inner web plates.

Also in this case, some slots will exist within a cell defining surface, and all that will apply which has been mentioned above with respect to sealing (or not) such a slot. For example, a dog passing through the slot for transmitting the axial force could be provided with a sealing slider which covers the slot. Alternatively, the dog may be connected to a sealing bellow or diaphragm.

In fact, the positive connection is preferably formed by respective dogs or prolongations which extend each through a respective one of the slots. In a particularly preferred embodiment, axially shiftable body or cylinder comprises recesses each assigned to a respective dog, and each of the dogs engages a respective recess. As mentioned above, the longitudinally or axially extending slots permit the dogs to pass through them along a path of displacement of the inner web plates in axial direction.

According to an advantageous embodiment for generating the axial forces in common the axially shiftable body or cylinder is biased or urged by a spring being at least partially accommodated within said cylinder which acts between the hollow shaft and the cylinder.

According to another favorable embodiment, the radial guidances for the web plates and the sealing strips comprise each a pair of guide plates forming a guiding slot, each guide plate being fixed to the shaft or hub, particularly to the hollow shaft, and front walls tightly fixed to both the front edges of the guide plates and the hub or shaft.

To simplify the construction, the front walls are preferably formed by a front disk which defines said cellular wheel in axial direction. The inner surface of such a disk may also define the cells of the rotary valve. In this way, front-side sealing of the interior of the cells is effected by the side edges of the web plates themselves, but in that only the front disks have to be sealed relative to the housing.

In a particularly beneficial embodiment, it is provided that the front disks have a peripheral conical surface and that sealing rings engage both the conical surface on the periphery of at least one of the front disks, preferably both, and the inner wall of the housing. The sealing rings may be under a certain urging force, such as a spring or a pneumatic or hydraulic force. This sealing method can be used with like advantages in all types of rotary valves comprising displaceable sealing strips. By the conical surfaces, radial forces are created too so that sealing is effected both against the front disks and the inner wall of the housing.

However, a further wearing problem can arise both in a rotary valve according to the invention and in any other rotary valve due to the pressure of the sealing strips.

Since the radially displaceable sealing strips should not fall out of their guidances within the regions of the supply opening and discharge opening, their radial path of displacement has to be limited also in these angular regions. This is effected by making the cells, and thus the web plates together with their sealing strips too, somewhat longer on either front side in axial direction than the axial lengths of the supply opening and discharge opening over which the sealing strips protrudes. In this way, the sealing strips slide along the inner wall of the housing within the region of both sides where they protrude beyond the axial length of the supply opening and the discharge opening whereby their radial path of displacement is limited also within the angular regions of the supply opening and discharge opening. Thus, the sealing strips are efficiently prevented from falling out of the guidances. It is clear that the sealing strips in these regions are biased by the same pressure as the remaining sealing strips which engage the inner wall over their entire length. Since, however, the contact surfaces between the sealing strips and the inner wall of the housing are limited to the protruding portion of the sealing strips, this will result in high surface pressure and, thus, to increased local wear of the sealing strips within these slide regions. The consequence could be different wear over the axial length of the sealing strips and, thus, a reduced radial sealing effect of the sealing strips. This problem cannot be solved by biasing the sealing strips with locally acting radial pressure, but in rotary valves of the kind according to the invention in particular, as well as in all rotary valves having a central adjusting device, in general, which converts a force acting on a plurality of sealing strips in common into radial pressure urging the sealing strips against the inner wall.

Therefore, it is a further object of the present invention to improve a rotary valve which comprises a housing having a supply opening and a discharge opening and define an inner substantially rotary symmetrical wall around an axis of rotation, and a cellular wheel supported rotatably about said axis of rotation within said housing where this wheel has a hub or shaft and a series of web plates in a star-shaped configuration on the shaft and a sealing strip on the radial outer edge of each web plate radially displaceable in guidances to engage the inner wall of the housing under an urging force. The improvement should be in such a way that a long-lasting uniform radial sealing effect of the sealing strips is achieved over their entire length.

This object is attained according to the invention in that the substantially rotary symmetrical inner wall changes its radius so as to be slightly larger within the regions of said supply opening and said discharge opening over the entire predetermined axial length of each of said sealing strips. Thus, the inner wall deviates only slightly from rotary symmetry or, in other words, remains still "substantially" rotary symmetrical.

In rotary valves comprising an adjusting device which converts a force acting upon a single one or a plurality of sealing strips in common into radial pressure urging the sealing strips against the inner wall, uniform surface pressure of these sealing strips, as desirable, is only achieved if the contact surfaces of these sealing strips are equally spaced from the axis of rotation of the shaft. If not, the force acting in common upon these sealing strips is no longer converted in a radial pressure which biases all sealing strips, but will bias only those of them with a correspondingly higher radial pressure whose common contact surface, which engages the housing's inner wall, has the shortest distance to the axis of the shaft. The remaining sealing strips whose contact surface has a larger distance from the axis will no longer experience a sealing radial force, because the are enabled to make way in radial direction, thus losing pressure.

Just this is achieved in a rotary valve according to a preferred embodiment of the invention which comprises an adjusting device for the sealing strips of the kind described, but only on those web plates which sweep just over the supply opening or the discharge opening. Within these regions, however, radial sealing is not necessary, because in these angular regions the cells are either filled or discharged. What is needed is only to prevent the sealing strips from falling out of their guidances which is attained by having the sealing strips protruding on either side in axial direction beyond the axial length of the supply opening and the discharge opening. This is ensured even when the radius of the inner wall of the housing is slightly increases. Therefore, no uneven surface pressure will occur over the length of the respective sealing strip and, thus, no uneven wear over the length of the sealing strips. In this way, the sealing effect within the significant angular regions of the cellular wheel outside the regions of the supply opening and the discharge opening is considerably improved.

A further advantage of this construction according to the invention consists in that, due to the relief of part of the sealing strips from radial forces, the radial forces acting upon the remaining sealing strips are even enhanced, because the sum of all radial forces corresponds to the same given axial force acting upon a plurality of sealing strips in common. In this way, the surface pressure, and thus the sealing effect of the sealing strips, is enhanced in all other significant angular regions. In total, the entire radial sealing of the cellular wheel is considerably improved by this embodiment according to the invention. Concurrently, the life of the sealing strips is increased due to equalization of wear.

In an advantageous embodiment using this change of radii of the housing's inner wall, the change of radii is not in steps, but continuous over a certain angular region, the angular region where a change of radius occurs extending beyond the regions of the supply opening and the discharge opening in peripheral direction. In this way, it is ensured that the sealing strips are relieved from pressure over the whole angular regions of the supply opening and the discharge opening, as desired, and that they to not impinge onto edges of the housing's inner wall when the wheel rotates further. The change in surface pressure, and thus the change of forces acting upon different sealing strips during rotation of the cellular wheel, is, therefore, not jerky, but continuous over time which results in a conserving strain and, thus, in a life time increase of all components.

BRIEF DESCRIPTION OF THE DRAWINGS

In the following, the invention will be described with reference to embodiments shown in the drawings in which.

DETAILED DESCRIPTION OF THE DRAWINGS

Figure 2:
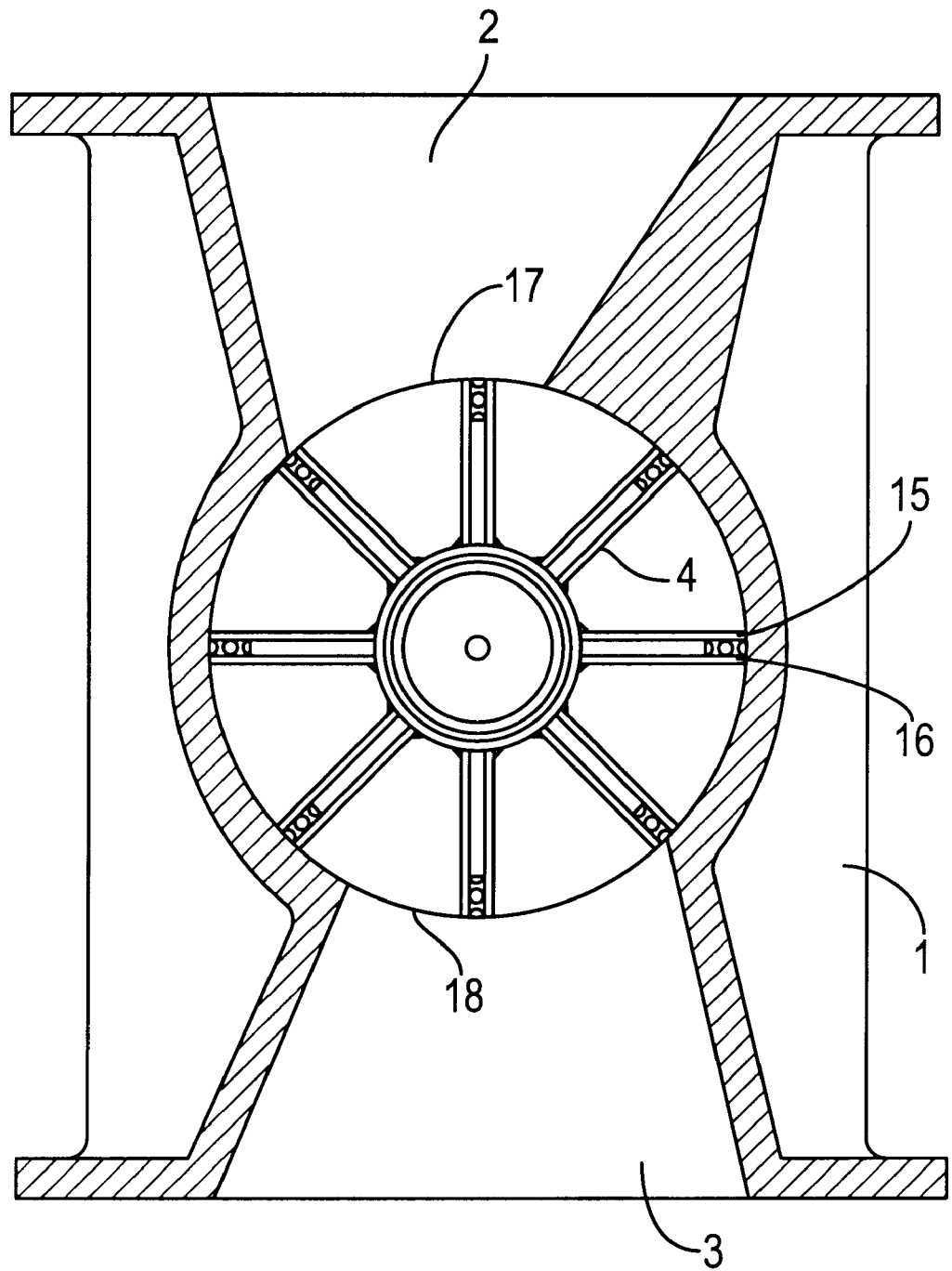
FIG. 2 is a radial I cross-section through a rotary valve.

In all embodiments, the rotary valve according to the invention comprises a housing 1 having a supply opening 2, a discharge opening 3 and a central portion (FIG. 2). Within the central portion, a cylindrical cellular wheel 4 rotates driven by a hollow shaft 9. The hollow shaft 9 is supported within covers 25, 26 closing the central portion of the housing on both front sides. The hollow shaft 9 projects to the outside beyond its bearing in the cover 25. From there, torque is applied to it.

Outside the range of an inner cell supply opening 17 and an inner cell discharge opening 18, front disks 19, 20 are sealingly fixed to the hollow shaft 9. Rectangular plates 15, 16 are also fixed both to these front disks 19, 20 and the hollow shaft 9. The plates 15, 16 together with the front disks 19, 20 form guidances for the displaceable parts of web plates. The web plates consist of wedge-shaped inner web plates 7 which are shorter than the axial length of the cells of the cellular wheel 4, and wedge-shaped outer web plates 8, on the peripheral edges of which sealing strips 5 are arranged. The web plates 7, 8, thus, form each a common actuating interface 6 inclined with respect to the axis of the hollow shaft.

As shown, the inner and outer web plates 7, 8 are complementing to form a rectangle, as is preferred. However, it is known that rotary valves can be tapered in axial direction and, therefore, it is within the scope of the present invention that the web plates 7, 8 together can also form a wedge-like configuration.

Within the hollow shaft 9 a hollow cylinder 11 is axially displaceable. Instead of a cylinder, any other body matching the cylindrical inner surface of the hollow shaft 9 could be used, such as a body formed by peripheral outer strips which are interconnected by spokes. Moreover, the cylinder is not necessarily hollow, although this is preferred. An alternative could be to use a massive cylinder (or other body) actuated and biased from outside the rotary valve by an appropriate biasing or actuating arrangement, such as a pneumatic or hydraulic cylinder, a magnet or the like. In the present embodiment, a pressure spring 14 is inserted between a cover 27 of the hollow cylinder 11 and a blanking plug 28 of the hollow shaft 9. The inner web plate 7 is allowed to displace within its guidance in axial direction, because it is shorter than the axial length of the cells of the cellular wheel 4. The web plate 7 comprises a dog 12 which passes through an axial slot in the hollow shaft 9 and engages a corresponding recess 13 of the hollow cylinder 11, thus forming a positive connection between the hollow cylinder 11 and the inner web plate 7.

Of course, the arrangement could be reversed by having the dog fixed to the cylinder, while the web plate 7 forms a recess or is connected to the cylinder in any other way.

Axial forces generated by the pressure spring 14 for all sealing strips in common act upon the inner web plates 7 assigned to a respective sealing strip. By the wedge-shaped actuating surfaces 6, they are converted into radial pressure which acts upon the outer web plates 8 and, thus, upon the sealing strips 5. By this pressure, the outer web plates 8 and, thus, the sealing strips 5 too are displaced in radial direction.

Sealing in axial direction is effected at the outer periphery of the front disks 19, 20 which, preferably, have conical surfaces 21, 22 to this end. These conical surfaces as well as the cylindrical inner wall of the housing are engaged by sealing rings 23, 24. Urging the sealing rings 23, 24 is done either by their own elasticity, by pneumatic or hydraulic devices or, as in the present case, by a spring (FIG. 1), preferably acting in axial direction.

Figure 1:
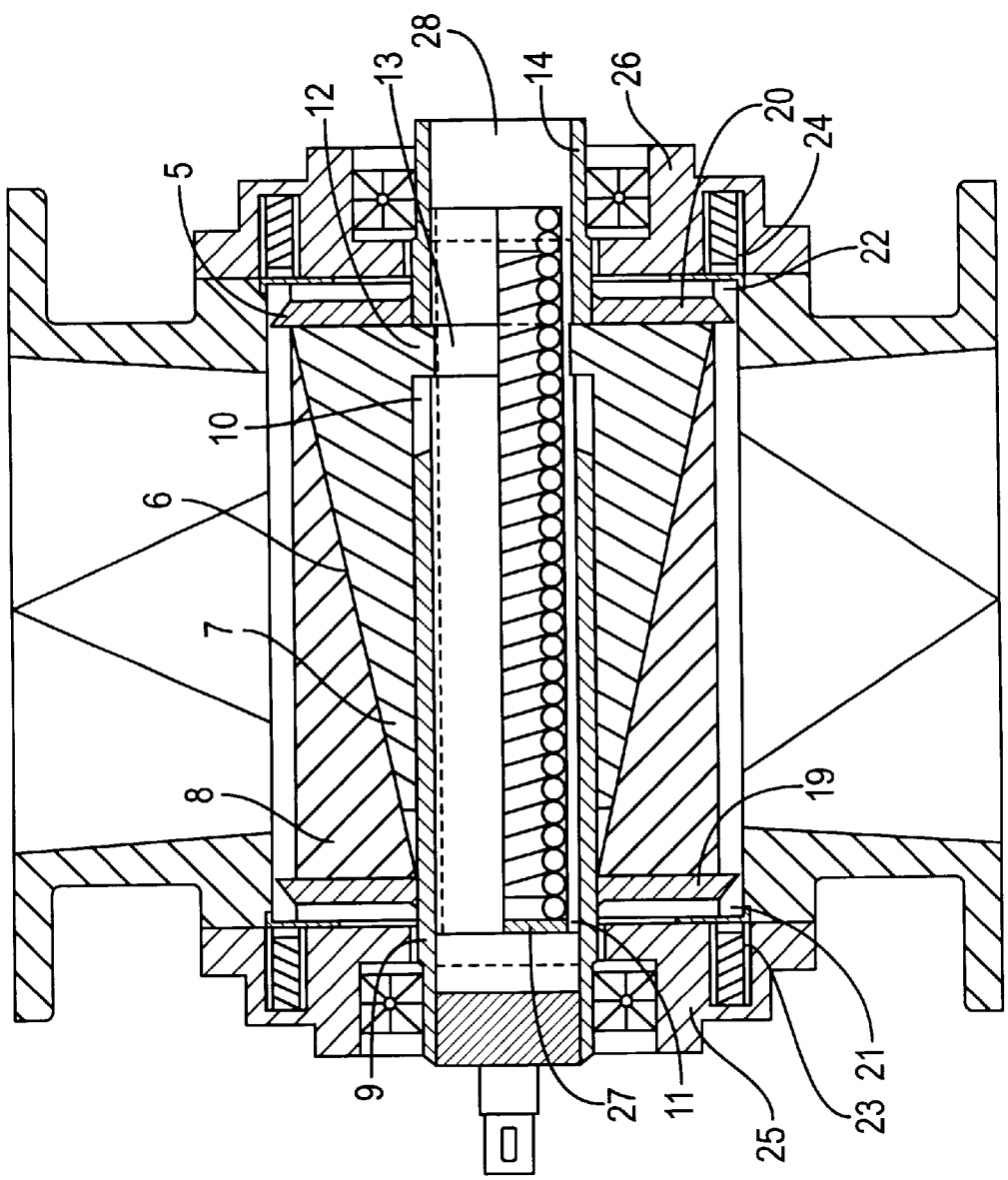
FIG. 1 is an axial cross-section through a rotary valve.
Figure 3:
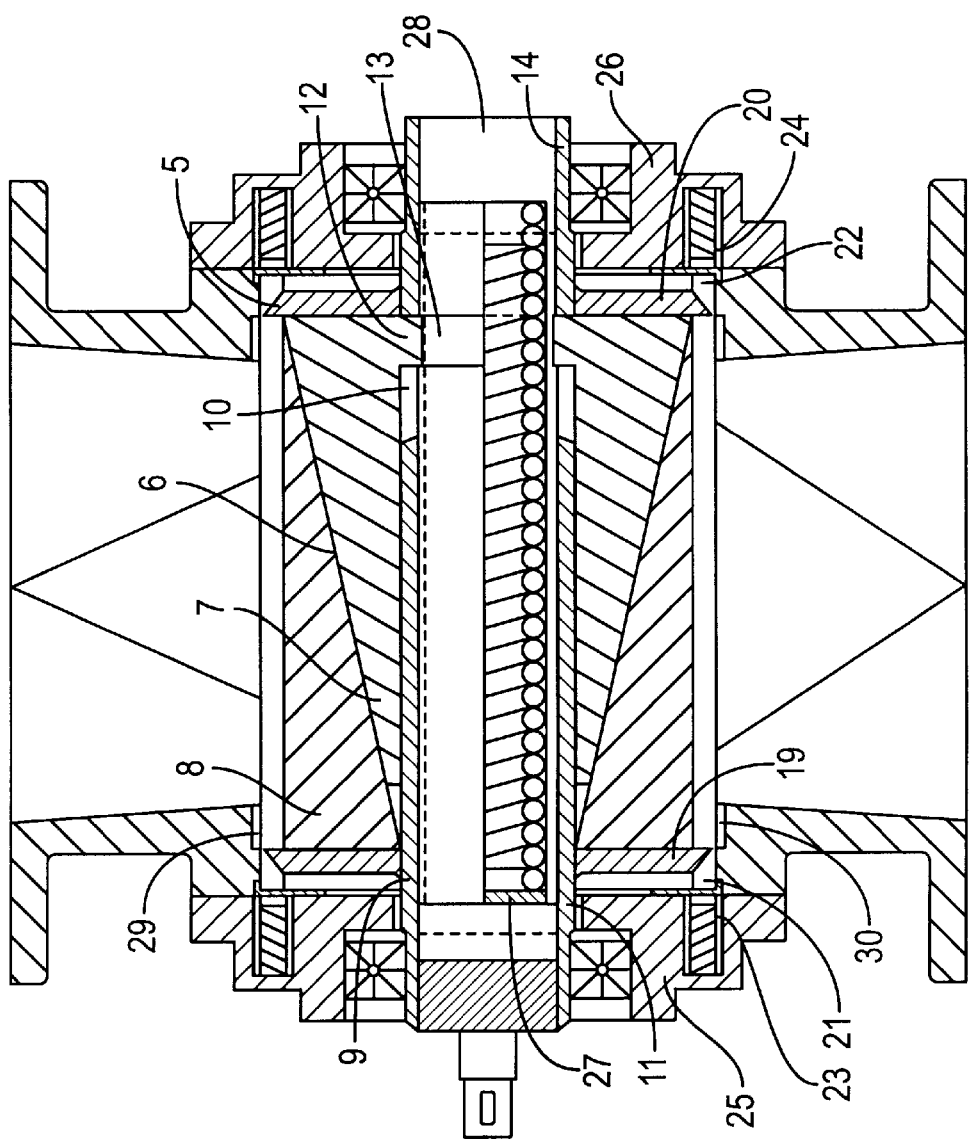
FIGS. 3 and 4 are cross-sectional views of another embodiment according to the invention similar to FIGS. 1 and 2.
Figure 4:
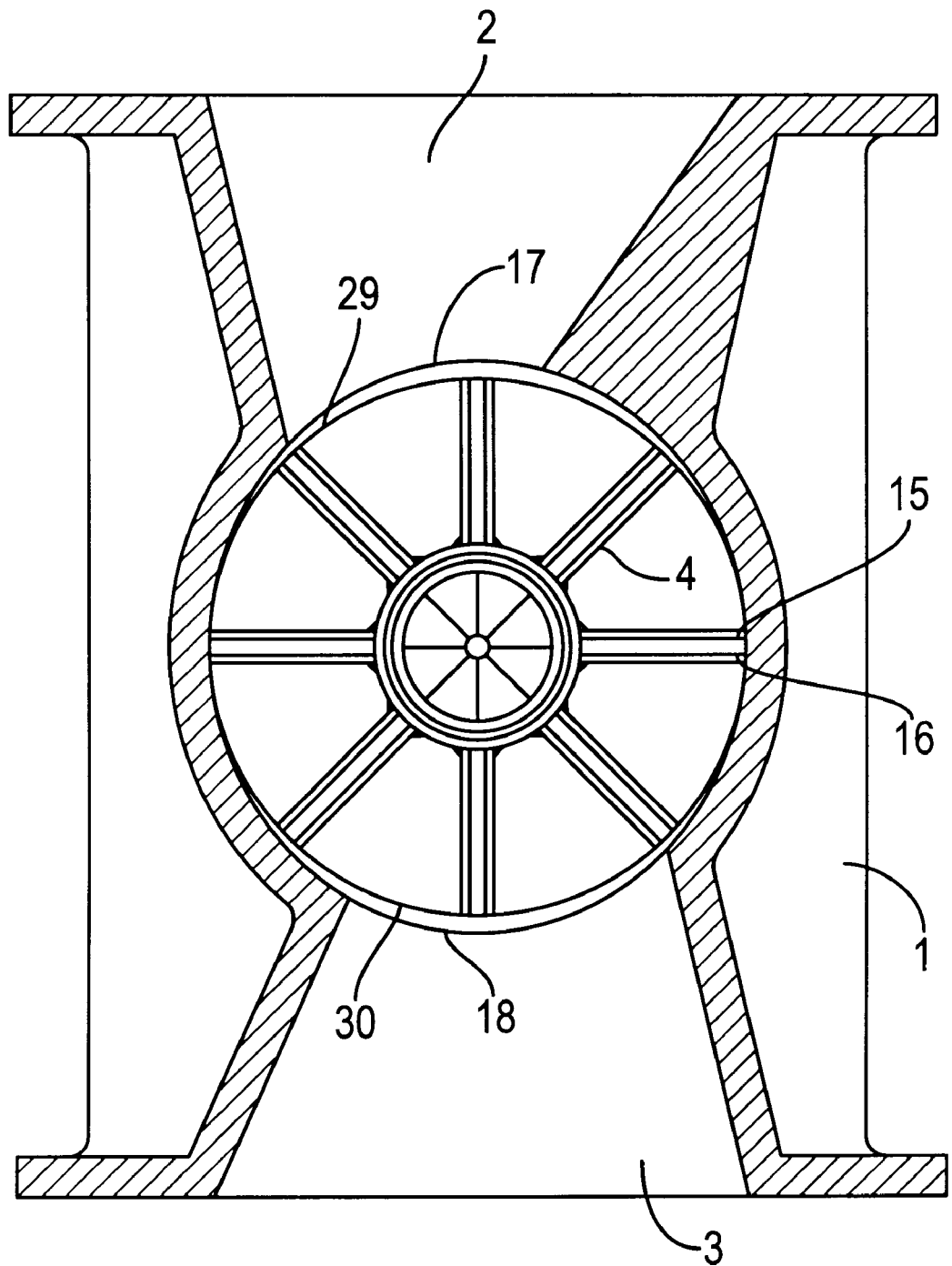

In the embodiment according to FIGS. 1 and 2, the housing 1 has a uniform inner diameter within the whole range of movement of the sealing strips 5. In the embodiment according to FIGS. 3 and 4, however, the housing's inner wall of the rotary valve has a slightly larger radius in the angular regions 29, 30 of the cell supply opening 17 and the cell discharge opening 18, swept by the cellular wheel, over the entire length of the sealing strips 5, as compared with the radius in the remaining angular regions which are swept by the cellular wheel 4. The change of radii of the housing's inner wall is continuous (FIG. 4) and reaches beyond the angular regions of the cell supply opening 17 and the cell discharge opening 18 in peripheral direction, as shown, as far as these regions are swept by the cellular wheel. In this case, the ends of the sealing strips which protrude axially beyond the respective opening are relieved from radial forces within this region and are enabled to make way in radial direction so that they are not subjected to excessive surface pressure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotary valve comprising
    a housing having a supply opening and a discharge opening and defining an inner substantially rotary symmetrical wall around an axis of rotation;
    a cellular wheel supported rotatably about said axis of rotation within said housing, having a predetermined axial length and including:
    hub means including drive shaft means;
    a series of first web plates arranged to extend radially in a star-shape on said hub means and having a radial outer wedge surface inclined with respect to said axis of rotation, said first web plates being shorter than said predetermined axial length,
    a series of second web plates having a radial outer edge and a radial inner wedge surface of a respective second web plate riding on and engaging said radial outer wedge surface of a respective first web plate;
    radial guide means for guiding each of said first and second web plates in pairs in radial direction,
    a sealing strip in the region of said radial outer edge of each of said web plates, said sealing strip being radially displaceable and guided by said radial guide means to engage said inner wall;
    adjusting means for generating an axial force to bias said first web plates to provoke a radial adjustment of the sealing strips when said first web plates glide along the interengaging wedge surfaces relative to said second web plates.

2. Rotary valve as claimed in claim 1, wherein pairs of said first and second web plates complement one another to form substantially a rectangle.

3. Rotary valve as claimed in claim 1, wherein said adjusting means comprise spring means for generating said axial force.

4. Rotary valve as claimed in claim 1, wherein said drive shaft means comprise a hollow shaft having a series of axially extending slots, each slot being assigned to one of said first web plates, and said adjusting means comprise axially shiftable means within said hollow shaft biased by said axial force and being positively connected to said first web plates.

5. Rotary valve as claimed in claim 4, wherein said axially shiftable means comprise a cylinder.

6. Rotary valve as claimed in claim 5, wherein said adjusting means comprise spring means for generating said axial force, said spring means being at least partially accommodated within said cylinder.

7. Rotary valve as claimed in claim 4, wherein said axially shiftable means are connected to dog means extending each through a respective one of said slots.

8. Rotary valve as claimed in claim 7, wherein said axially shiftable means comprise recesses each assigned to a respective dog means, each of said dog means engaging a respective recess.

9. Rotary valve as claimed in claim 1, wherein said radial guide means comprise a pair of guide plates on either side of each pair of said first and second web plates, said guide plates being parallel to and spaced from each other to form a guiding slot, each guide plate being fixed to said hub means and having an axially outer front edge, and front walls on either side of each pair of said first and second web plates, said front walls being tightly fixed to both said front edges and said hub means.

10. Rotary valve as claimed in claim 9, wherein said front walls are formed each by a front disk defining said cellular wheel in axial direction.

11. Rotary valve as claimed in claim 10, wherein said front disks are outside the direction of said supply opening and said discharge opening.

12. A rotary valve comprising
    a housing having a supply opening and a discharge opening and defining an inner substantially rotary symmetrical wall around an axis of rotation;
    a cellular wheel supported rotatably about said axis of rotation within said housing, having a predetermined axial length and including:
    hub means including drive shaft means;
    a series of web plate means arranged to extend radially in a star-shape on said hub means and having a radial outer edge;
    a sealing strip in the region of said radial outer edge of each of said web plate means, said sealing strip being radially displaceable to engage said inner wall;

radial guide means for guiding each of said sealing strips in radial direction, said radial guide means include a pair of guide plates on either side of each of said web plate means, said guide plates being parallel to and spaced from each other to form a guiding slot, each guide plate being fixed to said hub means and having an axially outer front edge, and a front disk on either side of each of said web plate means, said front disks being tightly fixed to both of said front edges and said hub means to define said cellular wheel in axial direction, and having a peripheral conical surface inclined radially downwards to the axial outside; and annular sealing means engaging both said conical surface on the periphery of at least one of said front disks and said inner wall of said housing.

13. Rotary valve as claimed in claim 12, further comprising urging means for forcibly engaging said annular sealing means on said conical surface under a certain urging force.

14. Rotary valve as claimed in claim 13, wherein said urging means are arranged to exert said urging force in axial direction.

15. A rotary valve comprising a housing having a supply opening and a discharge opening and defining an inner substantially rotary symmetrical wall around an axis of rotation;

a cellular wheel supported rotatably about said axis of rotation within said housing, having a predetermined axial length and including:

hub means including drive shaft means;

a series of web plate means arranged to extend radially in a star-shape on said hub means and having a radial outer edge;

a sealing strip in the region of said radial outer edge of each of said web plate means, said sealing strip having a predetermined axial length and being radially displaceable to engage said inner wall;

radial guide and urging means for guiding and urging each of said sealing strips in radial outward direction, wherein said substantially rotary symmetrical inner wall changes its radius so as to be slightly larger within the regions of said supply opening and said discharge opening over the entire predetermined axial length of each of said sealing strips.

16. Rotary valve as claimed in claim 15, wherein the change of radius is continuous and extends beyond said regions of the supply opening and the discharge opening in peripheral direction.

17. A rotary valve comprising a housing having a supply opening and a discharge opening and defining an inner substantially rotary symmetrical wall around an axis of rotation;

a cellular wheel supported rotatably about said axis of rotation within said housing, having a predetermined axial length and including:

hub means including drive shaft means;

a series of first web plates arranged to extend radially in a star-shape on said hub means and having a radial outer wedge surface inclined with respect to said axis of rotation, a series of second web plates having a radial outer edge and a radial inner wedge surface of a respective second web plate riding on and engaging said radial outer wedge surface of a respective first web plate;

radial guide means for guiding each of said first and second web plates in pairs in radial direction, a sealing strip in the region of said radial outer edge of each of said web plates, said sealing strip being radially displaceable and guided by said radial guide means to engage said inner wall;

adjusting means for generating an axial force to bias at least one series of said first and second web plates to provoke a radial adjustment of the sealing strips when said web plates glide along the interengaging wedge surfaces relative to each other.

* * * * *